United States Patent [19]

Kawakita

[11] Patent Number: 5,090,771
[45] Date of Patent: Feb. 25, 1992

[54] RECLINING DEVICE FOR VEHICULAR SEAT

[75] Inventor: Tadashi Kawakita, Kanagawa, Japan
[73] Assignee: Ikeda Bussan Co., Ltd., Ayase, Japan
[21] Appl. No.: 559,099
[22] Filed: Jul. 30, 1990
[30] Foreign Application Priority Data Jul. 31, 1989 [JP] Japan ............................ 1-90077[U]

[51] Int. Cl.⁵ ............................................. A47C 1/025
[52] U.S. Cl. ..................................... 297/362; 475/342
[58] Field of Search ................ 297/362; 475/331, 338, 475/341, 342

[56] References Cited

U.S. PATENT DOCUMENTS

| | | | |
|---|---|---|---|
| 1,417,797 | 5/1922 | Cook et al. | 475/342 |
| 1,431,167 | 10/1922 | McCollum | 475/342 |
| 3,081,648 | 3/1963 | Duer | 475/342 X |
| 3,893,206 | 7/1975 | Pickles et al. | |
| 4,345,792 | 8/1982 | Shephard | 297/362 |
| 4,641,887 | 2/1987 | Klueting | 297/362 |
| 4,715,656 | 12/1987 | Walk et al. | 297/362 |

FOREIGN PATENT DOCUMENTS

| | | |
|---|---|---|
| 0319393 | 6/1989 | European Pat. Off. . |
| 0332340 | 9/1989 | European Pat. Off. . |
| 1555711 | 5/1975 | Fed. Rep. of Germany ...... 297/362 |
| 3729134 | 3/1989 | Fed. Rep. of Germany ...... 297/362 |
| 1586869 | 3/1981 | United Kingdom . |

*Primary Examiner*—Jose V. Chen
*Attorney, Agent, or Firm*—Foley & Lardner

[57] ABSTRACT

A reclining device for a vehicular seat with which position of a seat back is inclinably adjusted by rotating a rotation shaft. A control gear integral with the rotation shaft engages with planetary gears which are located around the rotation shaft. The planetary gears engage with both internal gears formed in base and arm frames in a manner to rotate the arm frame relative to the base frame. A disc section is integrally connected with the control gear to be coaxial with the rotation shaft. The disc section is fitted into a hollow formed in the base frame, so that the control gear is rotatably supported to have a sufficient supporting strength with no play.

8 Claims, 2 Drawing Sheets

RECLINING DEVICE FOR VEHICULAR SEAT

BACKGROUND OF THE INVENTION

1. Field of the Invention

The present invention relates to improvements in a reclining device with which a seat back is controllably adjustable in its inclined position relative to a seat cushion by effectively using a planetary gear mechanism.

2. Description of the Prior Art

It is well known that a vehicular seat is provided with a reclining device between a seat cushion and a seat back. The seat back is inclinably attached to the seat cushion through the reclining device. With this arrangement, the vehicular seat is freely adjustable in its position so as to fit with a passenger.

A reclining device of this kind requires the following: A structure is simplified; An assembly operation is easily carried out; A seat back is o freely adjustable in a proper position; A control operation is carried out by small power and with no play; And a sufficient rigidity can be gained so as to support the weight of the passenger by the seat back.

In view of these points, a variety of devices have hitherto been proposed and put into practical use. One of them is an arrangement with which a seat back is smoothly and inclinably adjustable in its position by effectively using a plurality of planetary gears. Such reclining devices are disclosed, for example, in Japanese Utility Model Publication No. 58-26602 and Japanese Utility Model Provisional Publication Nos. 60-187645 and 60-187646. In this arrangement, a plurality of planetary gears are supported on a predetermined revolution orbit in a state of engaging with internal gears of the base and arm frames which have a difference in number of teeth. A control gear engaging with the planetary gears is rotatably supported on an axis of a control shaft. Therefore, the arm frame is inclinably adjusted relative to the base frame by the rotation of the control shaft.

However, the following difficulties have been encountered in the above-discussed reclining device: Since the control gear is made of sheet metal or the like in general, a play tends to occur between the planetary gears and the control gear, and it is difficult to gain a sufficient strength with this device. Therefore, it is difficult that the arm frame is rigidly supported by the reclining device. In particular, when an electric motor is used for the power source to drive the device, a large torque is applied to the control gear through the rotation shaft. This causes the control gear to be broken and to slip out from the rotation shaft.

In general, since the supporting plate made of sheet metal is formed in a star shape, the supporting plate receives a part of each planetary gear at an edge section of the supporting plate and is loosely supported on the rotation shaft. Therefore, a play occurs between each of the planetary gears or rotation shaft and the other part. This prevents the device from obtaining a sufficient supporting strength and a rigid fixed state.

With the above-mentioned device, since the planetary gears unequally apply the pressing force to the supporting plate in the centripetal direction, the rotation shaft is eccentrically supported in the shaft-hole of the base frame and the arm frame. This makes the rotation shaft to be rotated with some difficulties.

In case that the device is driven by the electric motor or the like, since a large torque is applied to the gears of the reclining device, it is required that the gears have a sufficient mechanical strength so as to have a high reliability.

SUMMARY OF THE INVENTION

It is an object of the present invention to provide an improved reclining device for a vehicular seat, with which a seat back is lightly and smoothly adjusted in its inclined position relative to a seat cushion with no play.

Another object of the present invention is to provide an improved reclining device which has a sufficient supporting strength for supporting the seat back relative to the seat cushion.

A reclining device for a vehicular seat comprises a rotation shaft. A base frame has a first hollow, a first pit, and a first through-hole which are formed at a surface of the base frame and are generally coaxial with the rotation shaft. The first hollow is defined by a cylindrical surface formed with a first internal gear. The rotation shaft passes through the first through-hole and is rotatably supported in the first through-hole. The first pit is located outside of the first hollow in an axial direction of the rotation shaft. An arm frame has a second hollow which is formed at a surface of the arm frame and which is generally coaxial with the rotation shaft. The arm frame is connected to the base frame so that the first and third hollows are opposite to form a space. The second hollow is defined by a cylindrical surface formed with a second internal gear. A plurality of planetary gears are disposed in the space and engaged with the first and second internal gears. A supporting plate is rotatably supported on the rotation shaft to be generally coaxial with the rotation shaft and supports the planetary gears. A control gear is coaxially and fixedly connected to the rotation shaft to be disposed coaxial with the supporting plate. The control gear engages with the planetary gears. A disc section is fixedly connected to the control gear and located outside with respect to the control gear. The disc section is coaxial with the control gear and rotatably fitted in the first pit so that the control gear is disposed in the first hollow and engages with the planetary gears.

With this arrangement, the control gear is suitably supported in the second hollow through the disc section in a state of having a sufficient supporting strength with no play. Furthermore, the rotation shaft is prevented from becoming eccentric relative to the rotational axis while receiving a pushing force in a centripetal direction by the planetary gears and the like. Therefore, a rotational operation is lightly and smoothly carried out to adjust the position of a seat back.

DETAILED DESCRIPTION OF THE INVENTION

Figure 1:
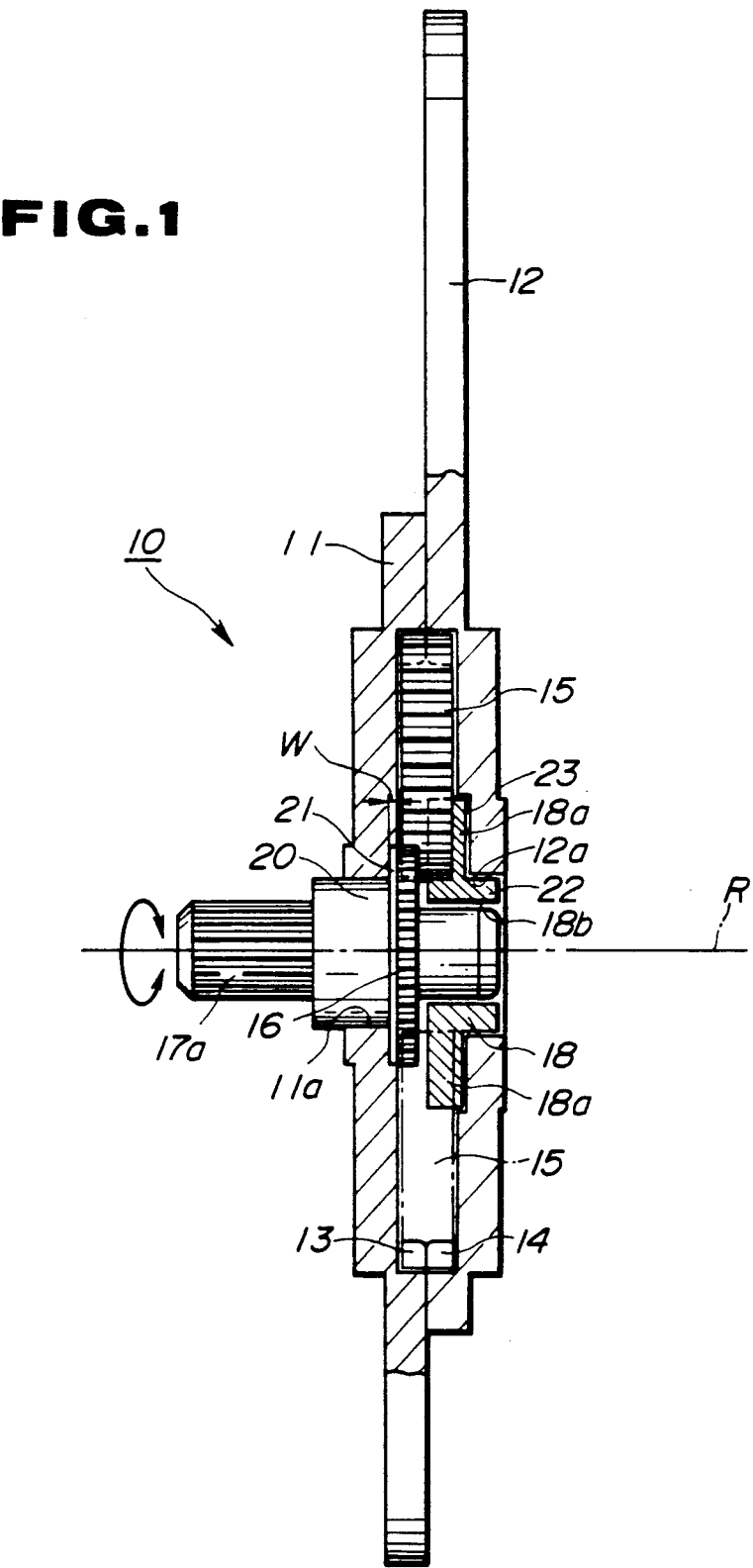
FIG. 1 is a front view, partly in section, of an embodiment of a reclining device for a vehicular seat, according to the present invention.
Figure 2:
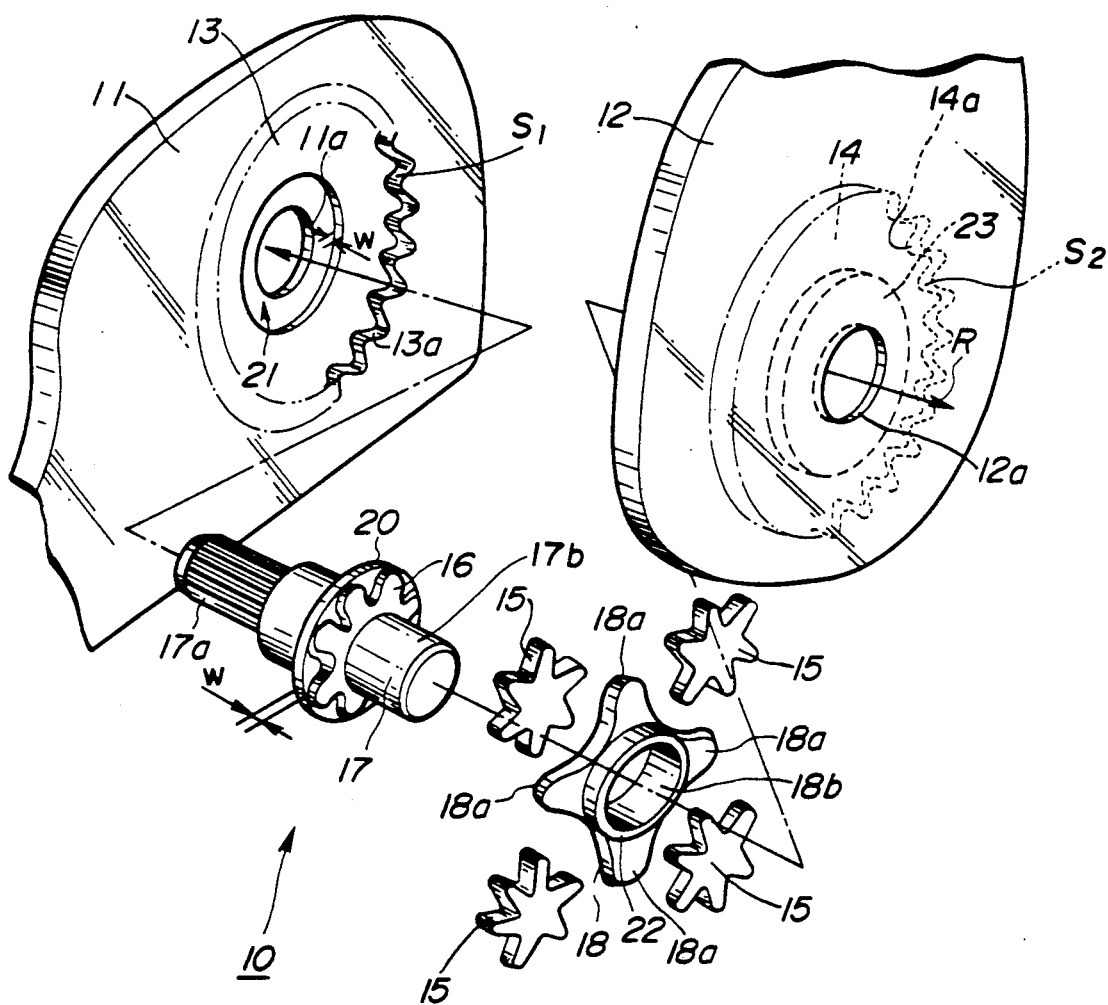
FIG. 2 is an exploded perspective view of the reclining device of FIG. 1.

Referring now to FIGS. 1 and 2, an embodiment of a reclining device for a vehicular seat, according to the present invention is illustrated by the reference numeral 10. The reclining device 10 comprises a base frame 11 disposed in a seat cushion (not shown). A rotational axis of the reclining device 10 is indicated by the character R in FIG. 1. The base frame 11 are rotatably connected to an arm frame 12 disposed in a seat back (not shown). The base frame 11 has a hollow 13 whose axis is aligned with the rotational axis R. The arm frame 12 has a hollow 14 which axis is aligned with the rotational axis R. The base frame 11 and the arm frame 12 are in slidable contact with each other in a manner that the hollows 13, 14 are located opposite to each other to form a space. Each of the base frame 11 and the arm frame 12 is formed with a cylindrical surface S1, S2 defining each hollow 13, 14. The cylindrical surface S1, S2 is formed with each internal gear 13a, 14a. The internal gears 13a, 14a have the same addendum circle and different teeth number from each other.

Four planetary gears 15 simultaneously engage with the internal gears 13a, 14a former in the hollows 13, 14. The planetary gears 15 further engage with a control gear 16 whose axis is aligned with the rotational axis R. The control gear 16 is coaxial with the hollows 13, 14 and acts as a sun gear.

A rotation shaft 17 is integrally connected with the control gear 16 in a manner that the control gear 16 is coaxially mounted on the rotation shaft 17. The rotation shaft 17 is rotatably fitted in a through-hole 11a which is formed in the base frame 11 and has an axis aligned with the rotational axis R. The control gear 16 is formed integral with the rotation shaft 17, for example, by press-fitting the control gear 16 into the rotation shaft 17 or by employing a one-piece structure. An end of the rotation shaft 17 extends outside the seat to form a control end 17a to which a control lever (not shown) is fixedly attached. The control end 17a may be arranged inside the seat, in which the control end 17a is driven by an electric motor or the like to control the reclining device 10.

A supporting plate 18 is rotatably mounted on the other end 17b of the rotation shaft 17 so as to support each of the planetary gears 15 at a predetermined revolution orbit. The supporting plate 18 is formed in a generally star shape so as to have four arm sections 18a which radially extend and with which the planetary gears 15 are supported. The supporting plate 18 has a center hole 18b whose axis is aligned with the rotational axis R. The end 17b of the rotation shaft 17 extends into the hole 18b.

A disc section 20 is formed integral with and outside the control gear 16 and has an axis aligned with the rotational axis R. The disc section 20, having a thickness W, is fitted in a pit 21 which is formed coaxial with the hollow 13 in the base frame 11 between the hollow and the through hole and has a depth W the same as the thickness W. With the thus arranged structure, the control gear 16 is rotatably supported to the base frame 11 through the disc section 20 so as to contact the outside surface of the disc section 20 with a bottom surface of the pit 21. Accordingly, no play is formed between the control gear 16 and the base frame 11, and therefore a sufficient supporting strength can be gained. Furthermore, this prevents the control gear 16 from sliding off broken and being from the rotation shaft 17. Additionally, the reclining device 10 can be operated under the power drive, such as that with the electric motor.

The supporting plate 18 has a cylindrical boss section 22 which projects from a side surface of the supporting plate 18 and is supported in a through-hole 12a which is formed in the arm frame 12. The through-hole 12a has an axis aligned with the rotational axis R. The arm frame 12 has a pit 23 in which the arm sections 18a of the supporting plate 18 are fitted, so that the supporting plate 18 is rotatably supported in the pit 23 of the arm frame 12. Accordingly, the supporting plate 18 can have a sufficient supporting strength relative to the planetary gears 15 with no play.

The manner of operation of the thus arranged reclining device will be discussed hereinafter.

When the control gear 16 is rotated in a desired direction through the rotation shaft 17, the planetary gears 15 are rotated corresponding to the rotation of the control gear 16. Under this rotation, the arm frame 12 is smoothly adjusted in its relative angle to the base frame 11. The angle between the base and arm frames 11, 12 is produced under the effect of the difference in number of teeth between the internal gears 13a, 14a. Furthermore, it will be understood that the arm frame 12 is rigidly fixed at a desired position under engagement of the planetary gears 15 with the internal gears 13, 14, when the control gear 16 is stopped its rotation.

Although the internal gears 13a, 14a have been shown and described as having the same addendum circle and different number of teeth from each other, it will be understood that the addendum circle and teeth of the internal gears may be formed respectively in various sizes and/or number.

Furthermore, it will be understood that the thus arranged device may be applied to a general seat in addition to the vehicular seat.

What is claimed is:

1. A reclining device for a vehicular seat comprising:
   a rotation shaft;
   a base frame having a first hollow, a first pit, and a first through-hole which are formed at a surface of said base frame and which are generally coaxial with said rotation shaft, said first hollow being defined by a cylindrical surface formed with a first internal gear, said rotation shaft passing through said first through-hole and being rotatably supported in said first through-hole, said first pit being located between said first hollow and said first through-hole in an axial direction of said rotation shaft;
   an arm frame having a second hollow which is formed at a surface of said arm frame and which is generally coaxial with said rotation shaft, said arm frame being connected to said base frame so that said first and second hollows are opposite to form a space, and said second hollow being defined by a cylindrical surface formed with a second internal gear;
   a plurality of planetary gears which are disposed in said space and which engage said first and second internal gears;
   a supporting plate rotatably supported on said rotation shaft and being generally coaxial with said rotation shaft, said supporting plate supporting said planetary gears;
   a control gear coaxially and fixedly connected to said rotation shaft and being disposed coaxial with said supporting plate, said control gear engaging with said planetary gears; and
   a disc section which is fixedly connected to said control gear and which is located between said control gear and an outer axial end of said rotation shaft, said disc section being coaxial with said control gear, said disc section being rotatably fitted in said first pit so that said control gear is disposed in said first hollow and engages with said planetary gears.

2. A reclining device as claimed in claim 1, wherein said base frame is fixedly connected to a seat cushion of the vehicular seat, and said arm frame is fixedly connected to a seat back of the vehicular seat.

3. A reclining device as claimed in claim 1, wherein said supporting plate has a hole into which said rotation shaft is fitted to rotatably support said supporting plate.

4. A reclining device as claimed in claim 1, wherein the number of teeth of said first internal gear differs from the number of teeth of said second internal gear.

5. A reclining device as claimed in claim 1, wherein said supporting plate has four arm sections which radially extend, said four arm sections supporting four planetary gears therebetween.

6. A reclining device as claimed in claim 1, wherein said first pit is defined by a flat surface formed in said arm frame, and wherein a flat surface of said disc section and said flat surface formed in said arm frame are in slidable contact with each other.

7. A reclining device for a vehicular seat comprising:
a rotation shaft;
a base frame having a first hollow, a first pit, and a first through-hole which are formed at a surface of said base frame and which are generally coaxial with said rotation shaft, said first hollow being defined by a cylindrical surface formed with a first internal gear, said rotation shaft passing through said first through-hole, said first pit being located between said first hollow and said first through-hole in an axial direction of said rotation shaft;
an arm frame having a second hollow and a second through-hole which are formed at a surface of said arm frame and which are generally coaxial with said rotation shaft, said arm frame being connected to said base frame so that said first and second hollows are opposite to form a cylindrical space, and said second hollow being defined by a surface with a second internal gear;
a plurality of planetary gears which are disposed in said space and which engage said first and second internal gears;
a supporting plate rotatably supported on said rotation shaft and being generally coaxial with said rotation shaft, said supporting plate supporting said planetary gears and having a boss section which extends into said second through-hole and is rotatably supported therein;
a control gear coaxially and fixedly connected to said rotation shaft and being disposed coaxial with said supporting plate, said control gear engaging with said planetary gears; and
a disc section which is fixedly connected to said control gear and which is located between said control gear and an outer axial end of said rotation shaft, said disc section being coaxial with said control gear, said disc section being rotatably fitted in said first pit so that said control gear is disposed in said first hollow and engages with said planetary gears.

8. A reclining device for a vehicular seat comprising:
a rotation shaft;
a base frame having a first hollow, a first pit, and a first through-hole which are formed at a surface of said base frame and which are generally coaxial with said rotation shaft, said first hollow being defined by a cylindrical surface formed with a first internal gear, said rotation shaft passing through said first though-hole, said first pit being located between said first hollow and said first through-hole in an axial direction of said rotation shaft;
an arm frame having a second hollow and a second pit with are formed at a surface of said arm frame and which is generally coaxial with said rotation shaft, said arm frame being connected to said base frame so that said first and second hollows are opposite to form a cylindrical space, and said second hollow being defined by a surface with a second internal gear;
a plurality of planetary gears which are disposed in said space and which engage and first and second internal gears;
a supporting plate rotatably supported on said rotation shaft and being generally coaxial with said rotation shaft, said supporting plate supporting said planetary gears and being rotatably fitted in said second pit;
a control gear coaxially and fixedly connected to said rotation shaft and being disposed coaxial with said supporting plate, said control gear engaging with said planetary gears; and
a disc section which is fixedly connected to said control gear and which is located between said control gear and an outer axial end of said rotation shaft, said disc section being coaxial with said control gear, said disc section being rotatably fitted in said first pit so that said control gear is disposed in said first hollow and engages with said planetary gears.

* * * * *